United States Patent
Yang et al.

(10) Patent No.: US 12,197,767 B2
(45) Date of Patent: Jan. 14, 2025

(54) OPERATION METHOD OF STORAGE DEVICE CONFIGURED TO SUPPORT MULTI-STREAM

(71) Applicant: SAMSUNG ELECTRONICS CO., LTD., Suwon-si (KR)

(72) Inventors: Seungjun Yang, Seoul (KR); Kangho Roh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 260 days.

(21) Appl. No.: 17/691,758

(22) Filed: Mar. 10, 2022

(65) Prior Publication Data

US 2022/0291864 A1   Sep. 15, 2022

(30) Foreign Application Priority Data

Mar. 11, 2021   (KR) .................. 10-2021-0032001

(51) Int. Cl.
*G06F 3/06* (2006.01)
*G06F 13/20* (2006.01)
*G06N 20/00* (2019.01)

(52) U.S. Cl.
CPC ............ *G06F 3/0655* (2013.01); *G06F 3/061* (2013.01); *G06F 3/0679* (2013.01); *G06F 13/20* (2013.01); *G06N 20/00* (2019.01)

(58) Field of Classification Search
None
See application file for complete search history.

(56) References Cited

U.S. PATENT DOCUMENTS

| | | | |
|---|---|---|---|
| 7,574,409 B2* | 8/2009 | Patinkin | H04L 51/212 706/12 |
| 10,321,144 B2* | 6/2019 | Sevin | H04N 19/196 |
| 10,387,796 B2 | 8/2019 | Kruglick | |
| 10,656,838 B2* | 5/2020 | Yang | G06F 13/18 |
| 10,671,916 B1 | 6/2020 | Sundararaman et al. | |
| 10,769,533 B2 | 9/2020 | Fougner et al. | |
| 11,343,632 B2* | 5/2022 | Blouet | G06F 3/165 |
| 2018/0046941 A1 | 2/2018 | Sule et al. | |
| 2019/0015059 A1 | 1/2019 | Itu et al. | |
| 2019/0243771 A1 | 8/2019 | Mittal et al. | |
| 2019/0361816 A1 | 11/2019 | Chen et al. | |
| 2020/0134416 A1 | 4/2020 | Niggemeyer et al. | |
| 2020/0150892 A1 | 5/2020 | Kim et al. | |
| 2021/0200477 A1 | 7/2021 | Seo et al. | |

FOREIGN PATENT DOCUMENTS

KR   10-2021-0085674 A   7/2021

* cited by examiner

*Primary Examiner* — Elias Mamo
(74) *Attorney, Agent, or Firm* — Muir Patent Law, PLLC

(57) ABSTRACT

Disclosed is an operation method of a storage device supporting a multi-stream, which includes receiving an input/output request from an external host, generating a plurality of stream identifier candidates by performing machine learning on the input/output request based on a plurality of machine learning models that are based on different machine learning algorithms, generating a model ratio based on a characteristic of the input/output request, applying the model ratio to the plurality of stream identifier candidates to allocate a final stream identifier for the input/output request, and storing write data corresponding to the input/output request in a nonvolatile memory device of the storage device based on the final stream identifier.

11 Claims, 14 Drawing Sheets

OPERATION METHOD OF STORAGE DEVICE CONFIGURED TO SUPPORT MULTI-STREAM

CROSS-REFERENCE TO RELATED APPLICATION

This application claims priority under 35 U.S.C. § 119 to Korean Patent Application No. 10-2021-0032001 filed on Mar. 11, 2021, in the Korean Intellectual Property Office, the disclosure of which is incorporated by reference herein in its entirety.

BACKGROUND

1. Field

Embodiments relate to a semiconductor memory, and more particularly, relate to an operation method of a storage device configured to support a multi-stream.

2. Description of the Related Art

A semiconductor memory device is classified as a volatile memory device, in which stored data disappear when a power supply is interrupted, such as a static random access memory (SRAM) or a dynamic random access memory (DRAM), or a nonvolatile memory device, in which stored data are retained even when a power supply is interrupted, such as a flash memory device, a phase-change RAM (PRAM), a magnetic RAM (MRAM), a resistive RAM (RRAM), or a ferroelectric RAM (FRAM). Nowadays, a flash memory-based solid state drive (SSD) is being widely used as a high-capacity storage medium of a computing system.

SUMMARY

According to an embodiment, an operation method of a storage device which supports a multi-stream may include receiving an input/output request from an external host, generating a plurality of stream identifier candidates by performing machine learning on the input/output request based on a plurality of machine learning models that are based on different machine learning algorithms, generating a model ratio based on a characteristic of the input/output request, applying the model ratio to the plurality of stream identifier candidates to allocate a final stream identifier for the input/output request, and storing write data corresponding to the input/output request in a nonvolatile memory device of the storage device based on the final stream identifier.

According to an embodiment, an operation method of a storage device which supports a multi-stream may include receiving a sequential input/output request from an external host, generating a first result value by performing machine learning on the sequential input/output request based on a first machine learning model, generating a second result value by performing machine learning on the sequential input/output request based on a second machine learning model, generating a first model ratio based on a characteristic of the sequential input/output request, applying the first model ratio to the first and second result values to generate a first stream identifier, allocating the first stream identifier to the sequential input/output request, receiving a random input/output request from the external host, generating a third result value by performing the machine learning on the random input/output request based on the first machine learning model, generating a fourth result value by performing the machine learning on the random input/output request based on the second machine learning model, generating a second model ratio different from the first model ratio based on a characteristic of the random input/output request, applying the second model ratio to the third and fourth result values to generate a second stream identifier, and allocating the second stream identifier to the random input/output request.

According to an embodiment, an operation method of a storage device which supports a multi-stream may include receiving an input/output request from an external host, generating a plurality of stream identifier candidates by performing machine learning on the input/output request based on a plurality of machine learning models that are based on different machine learning algorithms, generating a final stream identifier by performing inference on the plurality of stream identifier candidates based on an ensemble model, and storing write data corresponding to the input/output request in a nonvolatile memory device of the storage device based on the final stream identifier.

BRIEF DESCRIPTION OF THE DRAWINGS

Features will become apparent to those of skill in the art by describing in detail example embodiments with reference to the attached drawings in which.

DETAILED DESCRIPTION

Figure 1:
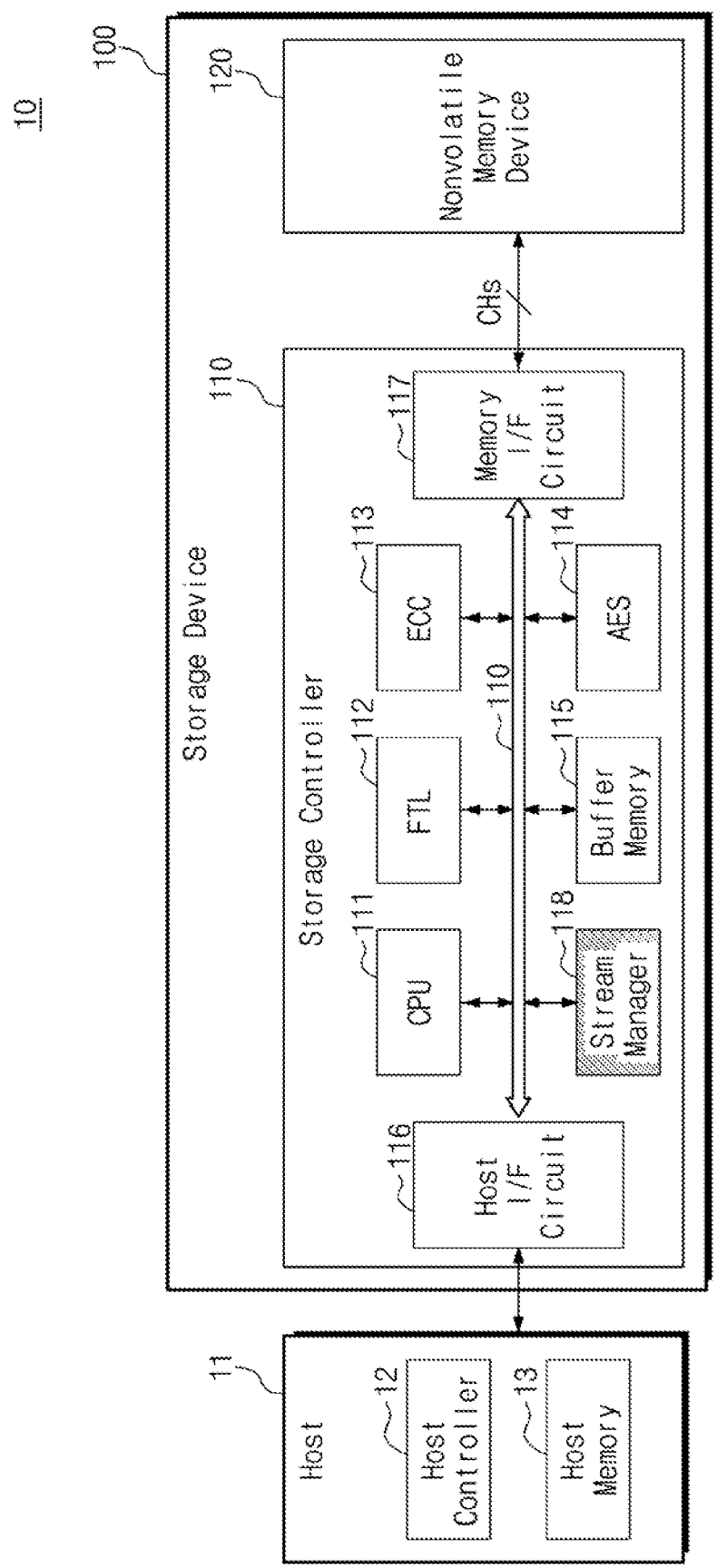
FIG. 1 is a block diagram illustrating a storage system according to an example embodiment.

FIG. 1 is a block diagram illustrating a storage system according to an example embodiment.

Referring to FIG. 1, a storage system 10 may include a host 11 and a storage device 100.

The storage system 10 may be, e.g., an information processing device that is configured to process a variety of information and to store the processed information, such as a personal computer (PC), a laptop, a server, a workstation, a smartphone, a tablet PC, a digital camera, and a black box.

The host 11 may control overall operations of the storage device 100. For example, the host 11 may send, to the storage device 100, a request (RQ) for storing data "DATA" in the storage device 100 or reading the data "DATA" stored in the storage device 100. The host 11 may be, e.g., a processor core that is configured to control the storage system 10, such as a central processing unit (CPU) or an application processor, or may be a computing node connected through a network.

The host 11 may include a host controller 12 and a host memory 13. The host controller 12 may be a device that is configured to control overall operations of the host 11 or to allow the host 11 to control the storage device 100. The host memory 13 may be a buffer memory, a cache memory, or a working memory that is used in the host 11.

The storage device 100 may operate under control of the host 11. The storage device 100 may include a storage controller 110 and a nonvolatile memory device 120. Under control of the host 11, the storage controller 110 may store data in the nonvolatile memory device 120 or may read data stored in the nonvolatile memory device 120. The storage controller 110 may perform various management operations for efficiently using the nonvolatile memory device 120.

The storage controller 110 may include, e.g., a central processing unit (CPU) 111, a flash translation layer (FTL) 112, an error correction code (ECC) engine 113, an advanced encryption standard (AES) engine 114, a buffer memory 115, a host interface (I/F) circuit 116, a memory interface circuit 117, and a stream manager 118.

The CPU 111 may control overall operations of the storage controller 110.

The FTL 112 may perform various operations for using the nonvolatile memory device 120 efficiently. The host 11 may manage a storage space of the storage device 100 by using logical addresses, and the FTL 112 may be configured to manage address mapping between a logical address from the host 11 and a physical address of the storage device 100. The FTL 112 may perform a wear-leveling operation to reduce or avoid degradation of a specific memory block of memory blocks of the nonvolatile memory device 120. The lifetime of the nonvolatile memory device 120 may be improved by the wear-leveling operation of the FTL 112. The FTL 112 may perform a garbage collection operation on the nonvolatile memory device 120 to secure a free memory block(s).

The FTL 112 may be implemented in the form of hardware or software. In the case where the FTL 112 is implemented in the form of software, a program code or information associated with the FTL 112 may be stored in the buffer memory 115 and may be executed by the CPU 111. In the case where the FTL 112 is implemented in the form of hardware, a hardware accelerator configured to perform the operation of the FTL 112 may be provided independently of the CPU 111.

The ECC engine 113 may perform error detection and error correction on data read from the nonvolatile memory device 120. For example, the ECC engine 113 may generate an error correction code (or a parity bit(s)) for data to be written in the nonvolatile memory device 120. The error correction code (or parity bit(s)) thus generated may be stored in the nonvolatile memory device 120 together with the data to be written. Afterwards, when the written data are read from the nonvolatile memory device 120, the ECC engine 113 may detect and correct an error of the read data based on the read data and the corresponding error correction code (or the corresponding parity bit(s)).

The AES engine 114 may perform an encryption operation on data received from the host 11 or may perform a decryption operation on data received from the nonvolatile memory device 120. The encryption operation or the decryption operation may be performed based on a symmetric-key algorithm.

The buffer memory 115 may be a write buffer or a read buffer configured to temporarily store data input to the storage controller 110. In another implementation, the buffer memory 115 may be configured to store a variety of information used for the storage controller 110 to operate. For example, the buffer memory 115 may store a mapping table that is managed by the FTL 112. In another implementation, the buffer memory 115 may store software, firmware, or information that is associated with the FTL 112.

The buffer memory 115 may be an SRAM. The buffer memory 115 may be implemented with various kinds of memory devices such as a DRAM, an MRAM, and a PRAM. For brevity of drawing and convenience of description, an embodiment is illustrated in FIG. 1 as the buffer memory 115 is included in the storage controller 110, but the buffer memory 115 may be placed outside the storage controller 110, and the storage controller 110 may communicate with the buffer memory 115 through a separate communication channel or interface.

The host interface circuit 116 may be configured to communicate with the host 11 in compliance with a given interface protocol. The given interface protocol may include at least one of protocols for various interfaces such as an ATA (Advanced Technology Attachment) interface, a SATA (Serial ATA) interface, an e-SATA (external SATA) interface, a SCSI (Small Computer Small Interface) interface, a SAS (Serial Attached SCSI) interface, a PCI (Peripheral Component Interconnection) interface, a PCIe (PCI express) interface, an NVMe (NVM express) interface, an IEEE 1394 interface, a USB (Universal Serial Bus) interface, a SD (Secure Digital) card interface, an MMC (Multi-Media Card) interface, an eMMC (embedded Multi-Media Card) interface, a UFS (Universal Flash Storage) interface, an eUFS (embedded Universal Flash Storage) interface, a CF (Compact Flash) card interface, or a network interface. The host interface circuit 116 may receive a signal, which is based on the given interface protocol, from the host 11, and may operate based on the received signal. In another implementation, the host interface circuit 116 may send a signal, which is based on the given interface protocol, to the host 11.

The memory interface circuit 117 may be configured to communicate with the nonvolatile memory device 120 in compliance with a given interface protocol. The given interface protocol may include at least one of protocols for various interfaces such as a toggle interface and an open NAND flash interface (ONFI). The memory interface circuit 117 may communicate with the nonvolatile memory device 120 based on the toggle interface. In this case, the memory interface circuit 117 may communicate with the nonvolatile memory device 120 through a plurality of channels CHs. Each of the plurality of channels CHs may include a plurality of signal lines configured to transfer various control signals (e.g., /CE, CLE, ALE, /WE, /RE, and R/B), data signals DQ, and a data strobe signal DQS.

The stream manager 118 may classify data or an input/output request received from the host 11 into a plurality of streams or may manage the data or the input/output request in units of stream. For example, the data received from the host 11 may have various attributes or various characteristics.

In a case where data are stored in the nonvolatile memory device 120 without separate data classification, a maintenance operation (e.g., a garbage collection operation) for the nonvolatile memory device 120 may be frequently performed. Overly frequent maintenance operations of the nonvolatile memory device 120 may cause an increase of a write amplification factor (WAF) characteristic of the storage device 100, which may cause a reduction of performance of the storage device 100.

In the present example embodiment, the stream manager 118 may classify data received from the host 11 in units of stream, based on various attributes (e.g., a logical block address, a data size, and a data frequency) of the received data, and may store the data in the nonvolatile memory device 120 based on the classified stream. In this case, because data of similar characteristics are classified as the same stream, the number of times of a maintenance operation for the nonvolatile memory device 120 may decrease. Accordingly, a reduction of overall performance of the storage device 100 may be prevented.

In the present example embodiment, the stream manager 118 may perform stream allocation on data based on a plurality of machine learning models. The plurality of machine learning models may perform stream classification on data based on different machine learning algorithms, and the stream manager 118 may combine results from the plurality of machine learning models based on the feature of the data, and may determine a final stream for the data. A structure and an operation of the stream manager 118 will be described in more detail below.

As described above, according to an example embodiment, even though there is no feature information (e.g., explicit stream designation) of data provided from the host 11, the storage device 100 may classify data into a plurality of streams based on information about various attributes of data and may manage the data based on a classification result. In this case, by decreasing the number of times of performing a maintenance operation for the nonvolatile memory device 120 (such as a garbage collection operation), the storage device 100 may be provided with improved performance and improved lifetime.

Figure 2:
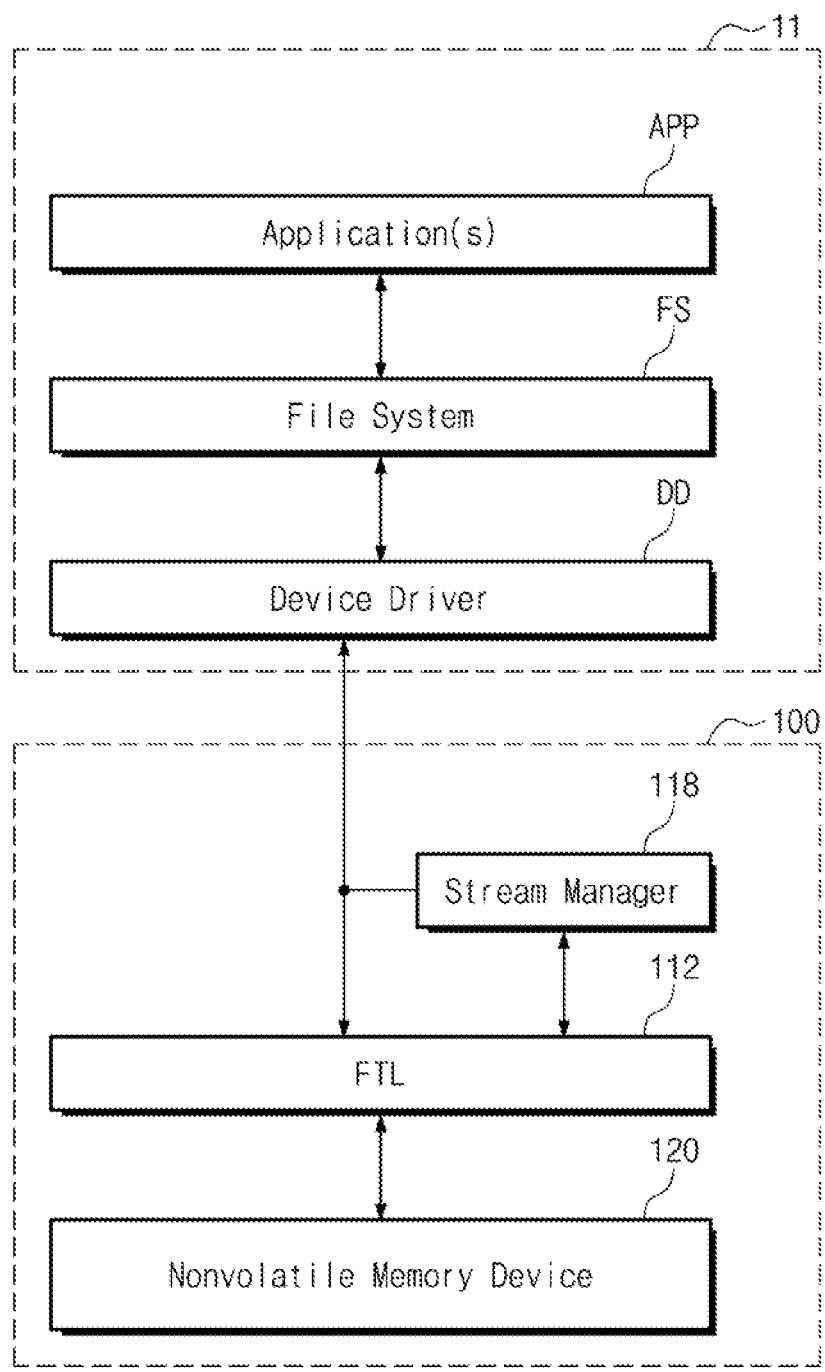
FIG. 2 is a diagram illustrating software layers of a storage system of FIG. 1.

FIG. 2 is a diagram illustrating software layers of a storage system of FIG. 1.

Referring to FIGS. 1 and 2, software layers of the storage system 10 may include an application layer APP, a file system layer FS, a device driver layer DD, the stream manager 118, and the flash translation layer 112.

The application layer APP may include various application programs (applications) that are driven by the host 11.

The file system layer FS may be configured to organize files or data that are used by the application layer APP. For example, the file system layer FS may be configured to manage a storage space of the storage device 100 by using a logical block address (LBA). The file system layer FS may be configured to allocate and manage a logical block address to data to be stored in the storage device 100. The file system layer FS may have a type that corresponds with an operating system of the host 11. For example, the file system layer FS may include at least one of various file systems such as FAT (File Allocation Table), FAT32, NTFS (NT File System), HFS (Hierarchical File System), JSF2 (Journaled File System2), XFS, ODS-5 (On-Disk Structure-5), UDF, ZFS, UFS (Unix File System), ext2, ext3, ext4, ReiserFS, Reiser4, ISO 9660, Gnome VFS, BFS, and WinFS.

The device driver layer DD may translate information from the file system layer FS or the application layer APP into information that is recognizable by the storage device 100.

The application layer APP, the file system layer FS, and the device driver DD may be implemented in the form of software and may be driven on the host 11.

The stream manager 118 may be configured to allocate a stream to a request received from the host 11. The stream manager 118 may be configured to allocate a stream to data based on machine learning.

The FTL 112 may be configured to translate a logical block address of a request received from the host 11 into a physical block address (or a physical address) to be used in the nonvolatile memory device 120. The FTL 112 may receive information about an allocated stream identifier from the stream manager 118, and may perform address mapping such that a request received from the host 11 is stored in the nonvolatile memory device 120 for each allocated stream.

Figure 3:
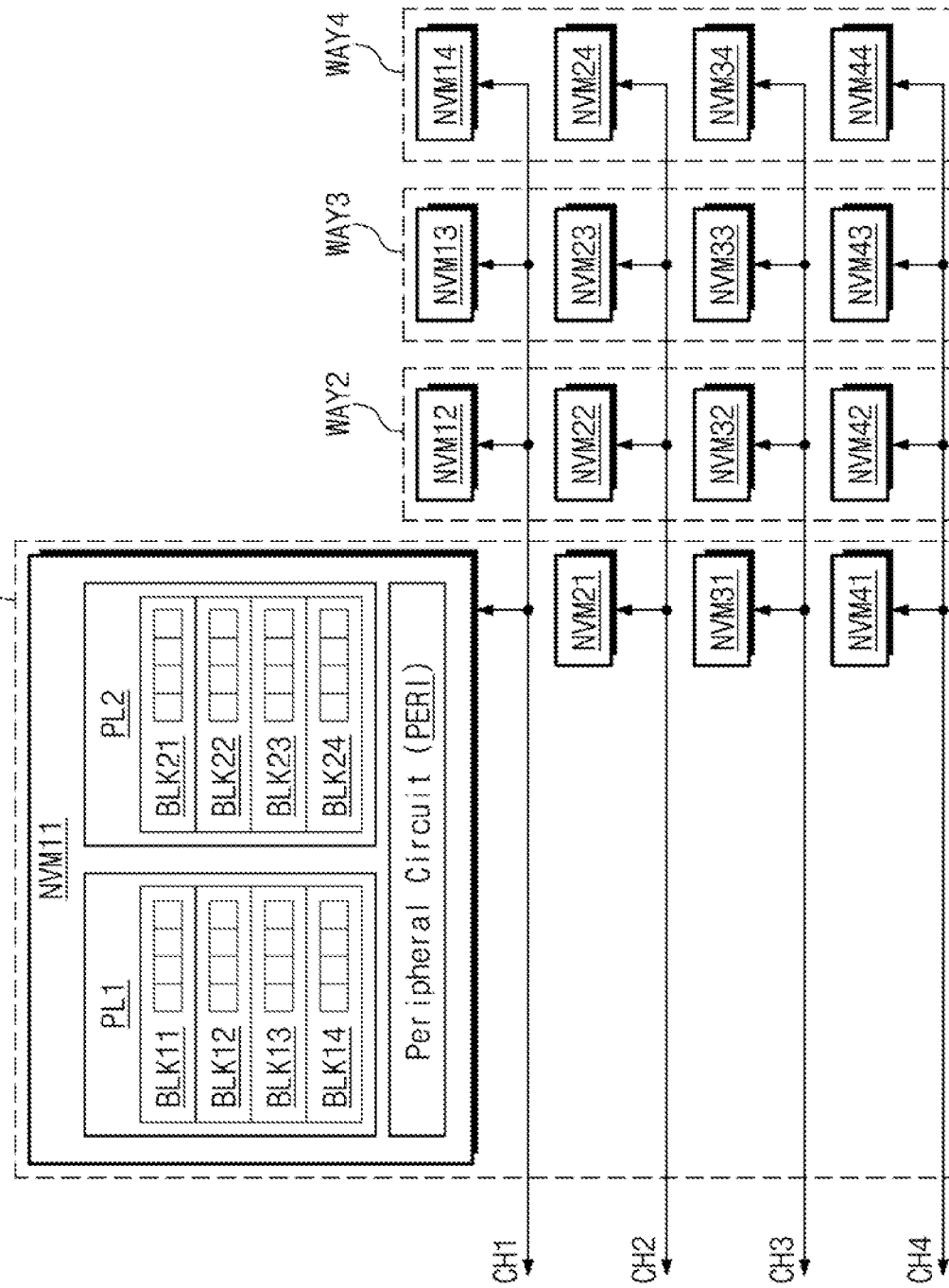
FIG. 3 is a block diagram illustrating a nonvolatile memory device of FIG. 1.
Figure 4:
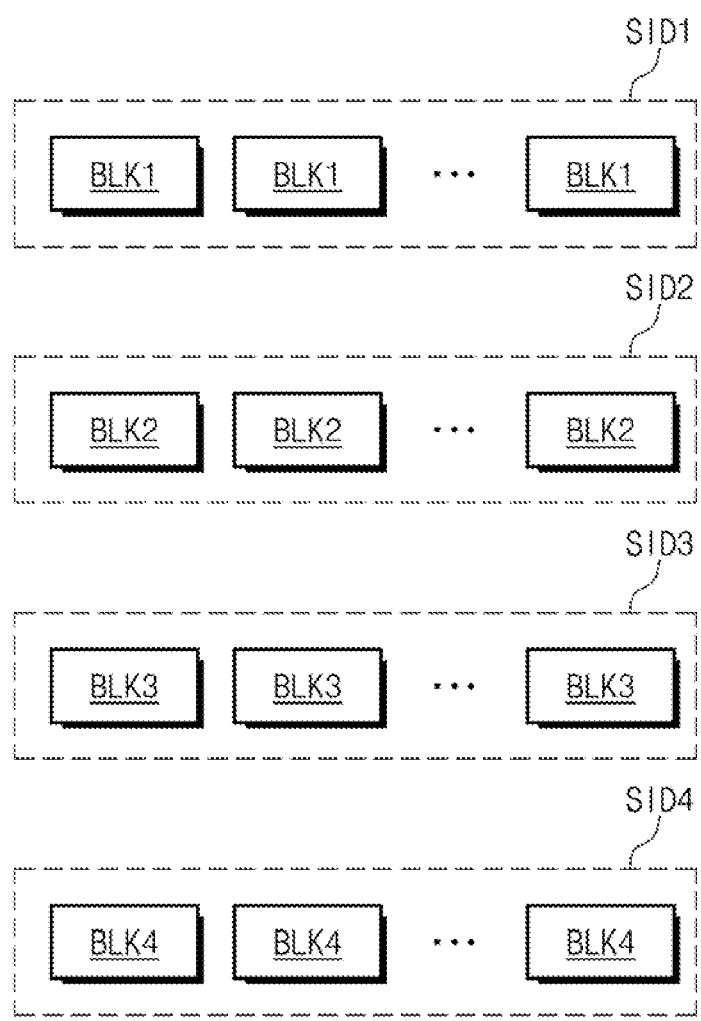
FIG. 4 is a diagram for describing streams managed at a storage device.

FIG. 3 is a block diagram illustrating a nonvolatile memory device of FIG. 1. FIG. 4 is a diagram for describing streams managed at a storage device.

Referring to FIGS. 1, 3, and 4, the nonvolatile memory device 120 may include a plurality of nonvolatile memories NVM11 to NVM44. Each of the plurality of nonvolatile memories NVM11 to NVM44 may be implemented with, e.g., one semiconductor chip, one semiconductor die, or one semiconductor package.

The nonvolatile memory NVM11 may include a plurality of planes PL1 and PL2 and a peripheral circuit PERI. The plane PL1 may include a plurality of memory blocks (e.g., a first memory block BLK11, a second memory block BLK12, a third memory block BLK13, and a fourth memory block BLK14, and the plane PL2 may likewise include a plurality of memory blocks (e.g., BLK21 to BLK24). Each of the plurality of memory blocks BLK11 to BLK14 and BLK21 to BLK24 may include a plurality of pages. A plurality of memory blocks (e.g., BLK11 to BLK14) included in a same plane (e.g., PL1) may be configured to share the same bit lines.

The peripheral circuit PERI of the nonvolatile memory NVM11 may be connected with a corresponding channel (e.g., CH1) of a plurality of channels CH1 to CH4. In response to various signals received through the corresponding channel, the peripheral circuit PERI may store data received through the corresponding channel in the plurality of planes PL1 and PL2 or may output data read from the plurality of planes PL1 and PL2 through the corresponding channel. The peripheral circuit PERI may include, e.g., an address decoder, a voltage generator, a page buffer circuit, an input/output circuit, and a control logic circuit.

For brevity of drawing, an example where one nonvolatile memory NVM11 includes two planes PL1 and PL2 and each of the planes PL1 and PL2 includes four memory blocks is illustrated, but the number of planes, the number of memory blocks, or the number of pages may be variously changed or modified. The remaining nonvolatile memories NVM12 to NVM44 may be similar in structure to the nonvolatile memory NVM11 described above, and thus, additional description will be omitted to avoid redundancy.

A first part of the plurality of nonvolatile memories, e.g., NVM11, NVM12, NVM13, and NVM14 of the plurality of nonvolatile memories NVM11 to NVM44, may communicate with the storage controller 110 through the first channel CH1, a second part NVM21, NVM22, NVM23, and NVM24 of the plurality of nonvolatile memories NVM11 to NVM44 may communicate with the storage controller 110 through the second channel CH2, a third part NVM31, NVM32, NVM33, and NVM3 of the plurality of nonvolatile memories NVM11 to NVM44 may communicate with the storage controller 110 through the third channel CH3, and a fourth part NVM41, NVM42, NVM43, and NVM44 of the plurality of nonvolatile memories NVM11 to NVM44 may communicate with the storage controller 110 through the fourth channel CH4. The first part NVM11, NVM21, NVM31, and NVM41 may constitute a first way WAY1, the second part NVM12, NVM22, NVM32, and NVM42 may constitute a second way WAY2, the third part NVM13, NVM23, NVM33, and NVM3 may constitute a third way WAY3, and the fourth part NVM14, NVM24, NVM34, and NVM44 may constitute a fourth way WAY4. Thus, in an example embodiment the nonvolatile memory device 120 may have a multi-way/multi-channel structure.

The storage device 100 may manage a plurality of memory blocks included in the nonvolatile memory device 120 based on a plurality of streams.

For example, referring to FIG. 4, the storage device 100 may manage first memory blocks BLK1 of a plurality of memory blocks as a stream corresponding to a first stream identifier SID1, may manage second memory blocks BLK2 of the plurality of memory blocks as a stream corresponding to a second stream identifier SID2, may manage third memory blocks BLK3 of the plurality of memory blocks as a stream corresponding to a third stream identifier SID3, and may manage fourth memory blocks BLK4 of the plurality of memory blocks as a stream corresponding to a fourth stream identifier SID4.

Memory blocks (e.g., the first memory blocks BLK1) corresponding to the same stream identifier (e.g., SID1) may be included in the same plane, may be included in the same nonvolatile memory, may be included in nonvolatile memories connected with the same channel, or may be included in nonvolatile memories included in the same way. In another implementation, memory blocks (e.g., the first memory blocks BLK1) corresponding to a stream identifier (e.g., SID1) may be distributed into a plurality of nonvolatile memories.

As described above, the stream manager 118 may manage data of similar characteristics as the same stream. The data of the similar characteristics may be stored in memory blocks corresponding to the same stream. In this case, because data stored at the same stream have similar characteristics, the performance of the storage device 100 may be prevented from being reduced due to a maintenance operation (e.g., a garbage collection operation), and/or a write amplification factor (WAF) may be reduced.

Figure 5:
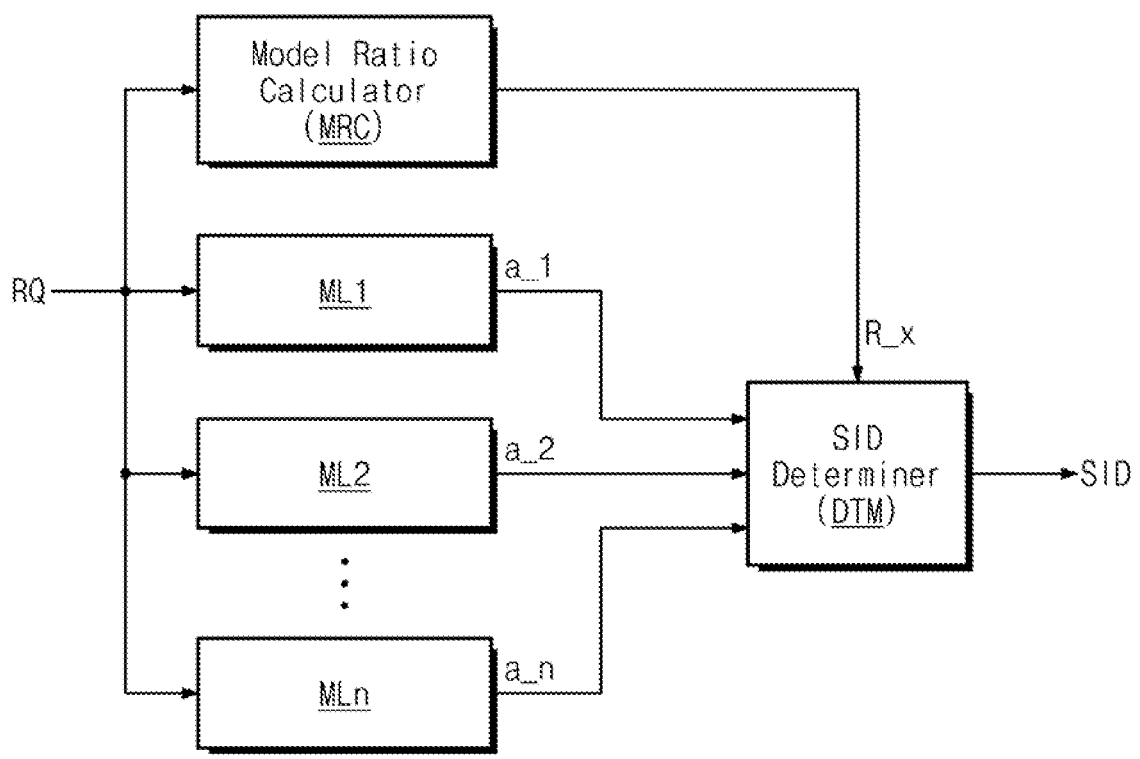
FIG. 5 is a diagram illustrating a stream manager of FIG. 1.

FIG. 5 is a diagram illustrating a stream manager of FIG. 1.

Below, it is assumed by way of example that the storage device 100 receives a write request RQ from the host 11, and allocates a stream identifier SID based on the received write request RQ. The write request RQ may not include separate information about attributes or characteristics (e.g., a stream) of data. An example of allocation of a stream to one write request RQ will be described below. The stream manager 118 may accumulate a plurality of write requests and may allocate streams to the accumulated write requests. A plurality of write requests may be accumulated based on logical block addresses, and a sum of data associated with the plurality of write requests may have a given unit (e.g., a chunk unit). Also, the storage device 100 may perform a follow-up operation (i.e., an address mapping operation and a program operation) based on the method described with reference to FIGS. 1 to 4, such that write data corresponding to a write request are stored in the nonvolatile memory device 120 for each allocated stream.

Below, the terms "stream", "stream identifier", etc. are used. The stream may mean a set of data having the same feature or similar characteristics. In another implementation, the stream may mean a set of data, of which logical block addresses managed by the host 11 are continuous (or sequential). The stream identifier may be allocated to each of a plurality of streams as unique information for distinguishing the plurality of streams.

Referring to FIGS. 1 and 5, the stream manager 118 may include a plurality of machine learning models ML1 to MLn, a model ratio calculator MRC, and a stream identifier determiner DTM. The stream manager 118 or each of components included in the stream manager 118 may be implemented based on a software module, a hardware block, a hardware intellectual property (IP) a hardware accelerator, or a combination thereof.

The plurality of machine learning models ML1 to MLn may perform machine learning on the write request RQ and may output result values a_1 to a_n, respectively. The result values a_1 to a_n of the plurality of machine learning models ML1 to MLn may be used as a stream identifier candidate associated with the write request RQ. For example, various characteristics of the write request RQ may be provided as an input value of the plurality of machine learning models ML1 to MLn. The plurality of machine learning models ML1 to MLn may perform machine learning on various characteristics of the write request RQ and may draw the result values a_1 to a_n, respectively. Characteristics or attributes of the write request RQ may include information such as a logical block address (LBA) range and a request size, an overwrite ratio, a logical block address continuity of adjacent write requests (or workloads) (or a logical block address continuity of input/output requests adjacent to an input/output request), etc.

The plurality of machine learning models ML1 to MLn may use different machine learning algorithms. Thus, the result values a_1 to a_n that are respectively obtained by the plurality of machine learning models ML1 to MLn with respect to the same write request RQ may be different. The machine learning algorithms may include one or more of, e.g., a linear regression algorithm, a support vector machine algorithm, a deep neural network algorithm, a deep stream algorithm, a K-Mean algorithm, a clustering algorithm, an auto encoder algorithm, a convolutional neural network algorithm, and a Siamese network algorithm.

The stream manager 118 may determine the stream identifier SID of the write request RQ, based on one of the result values a_1 to a_n of the plurality of machine learning models ML1 to MLn or a combination thereof.

The model ratio calculator MRC of the stream manager 118 may calculate a model ratio R_x based on the write request RQ. The model ratio R_x may indicate a ratio or a weight that is applied to the result values a_1 to a_n of the plurality of machine learning models ML1 to MLn. For example, the first machine learning model ML1 of the plurality of machine learning models ML1 to MLn may classify a sequential pattern relatively accurately, and the second machine learning model ML2 thereof may classify a random pattern relatively accurately. When the write request RQ has a sequential pattern, the model ratio calculator MRC may calculate the model ratio R_x such that the first result value a_1 of the first machine learning model ML1 is applied to the stream identifier SID at a relatively high ratio. In another implementation, when the write request RQ has a random pattern, the model ratio calculator MRC may calculate the model ratio R_x such that the second result value a_2 of the second machine learning model ML2 is applied to the stream identifier SID at a relatively high ratio.

The model ratio calculator MRC may calculate the model ratio R_x based on characteristics or attributes of the write request RQ. The characteristics or attributes of the write request RQ may include information such as a logical block address (LBA) range and a request size, an overwrite ratio, a logical block address continuity of adjacent write requests (or workloads), etc. A configuration and an operation of the model ratio calculator MRC will be described in more detail with reference to FIG. 6.

The stream identifier determiner DTM may receive the plurality of result values a_1 to a_n from the plurality of machine learning models ML1 to MLn, and may receive the model ratio R_x from the model ratio calculator MRC. The stream identifier determiner DTM may determine or allocate the stream identifier SID to the write request RQ by applying the model ratio R_x to the result values a_1 to a_n of the plurality of machine learning models ML1 to MLn.

The stream identifier SID may be calculated by, e.g., Equation 1 below.

$$SID = \frac{1}{n}\sum_{i=1}^{n} a_i \times r_i \qquad \text{[Equation 1]}$$

In Equation 1, "n" represents the number of machine learning models, $a_i$ represents a result value of an i-th machine learning model MLi, and $r_i$ represents a coefficient corresponding to the i-th machine learning model MLi from among coefficients included in the model ratio R_x.

As described above, the stream identifier SID may be determined by applying the model ratio R_x to the result values a_1 to a_n of the plurality of machine learning models ML1 to MLn.

In a case where a single machine learning model is used to classify or allocate streams, the accuracy or performance of stream classification in a specific logical block address range may be reduced depending on a characteristic of the one machine learning model.

In the present example embodiment, the stream manager 118 may determine the stream identifier SID by calculating stream identifier candidates (i.e., the result values a_1 to a_n) of the write request RQ through the plurality of machine learning models ML1 to MLn, and applying the model ratio R_x (which is based on the write request RQ) to the calculated stream identifier candidates. In this case, with regard to various characteristics of the write request RQ, result values calculated from different machine learning models may be predominantly applied to the stream identifier SID. Accordingly, the accuracy of stream classification of the storage device 100 may be improved. This may provide the storage device 100 with improved performance and/or an improved WAF characteristic.

Figure 6:
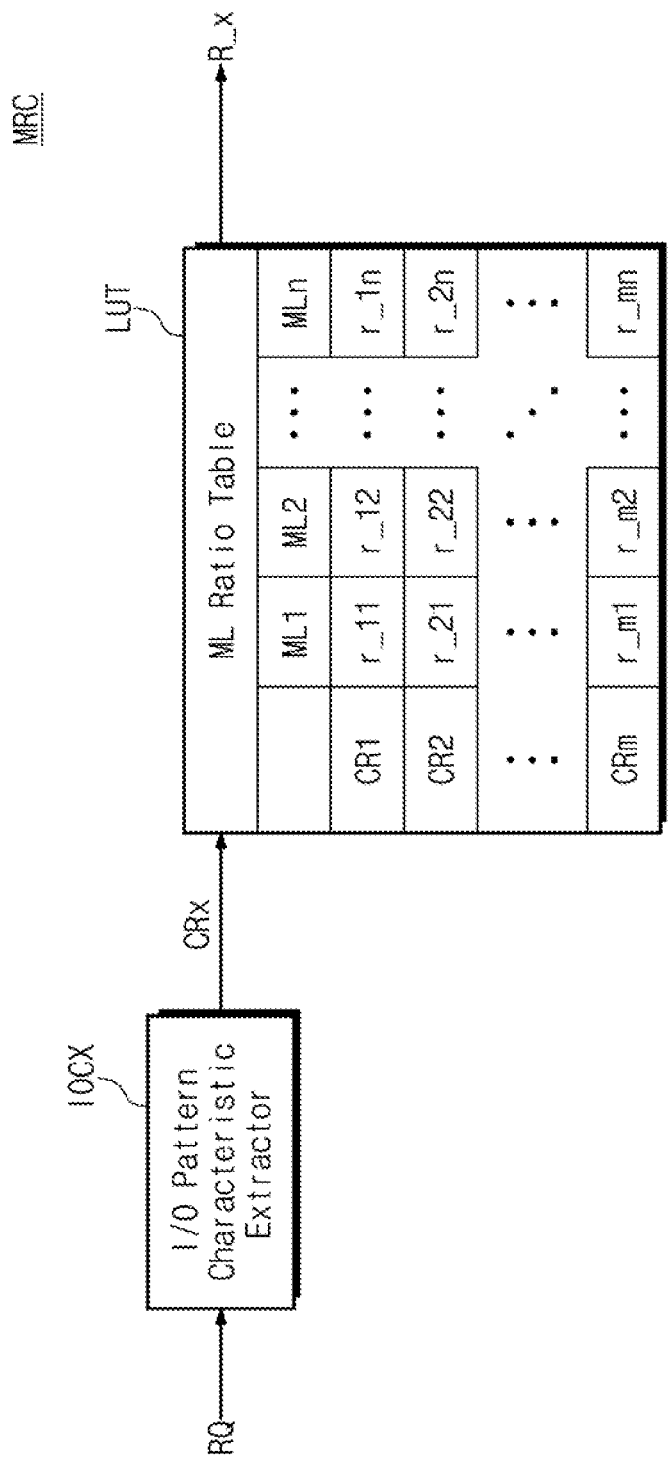
FIG. 6 is a block diagram illustrating an example of a model ratio calculator of FIG. 5.

FIG. 6 is a block diagram illustrating an example of a model ratio calculator of FIG. 5.

Referring to FIGS. 1, 5, and 6, the model ratio calculator MRC of the stream manager 118 may include a characteristic extractor IOCX and a lookup table LUT.

The characteristic extractor IOCX may be configured to extract a characteristic of the write request RQ. For example, the characteristic of the write request RQ may include, e.g., one or more of a logical block address, a logical block address range, a request size of the write request RQ, an overwrite ratio, and a logical block address continuity of adjacent write requests (or workloads).

The lookup table LUT may include a plurality of entries, which may correspond to a plurality of characteristics CR1 to CRm. The plurality of entries may include a plurality of coefficients r_11 to r_mn respectively corresponding to the plurality of characteristics CR1 to CRm and the plurality of machine learning models ML1 to MLn.

The model ratio calculator MRC may select the model ratio R_x corresponding to a characteristic CRx of the write request RQ from the lookup table LUT. For example, in the case where a characteristic extracted from the characteristic extractor IOCX is the first characteristic CR1, the model ratio calculator MRC may select [r_11, r_12, . . . , r_1n] as the model ratio R_x. As another example, in the case where the characteristic extracted from the characteristic extractor IOCX is the second characteristic CR2, the model ratio calculator MRC may select [r_21, r_22, . . . , r_2n] as the model ratio R_x. The selected model ratio R_x may be provided to the stream identifier determiner DTM described with reference to FIG. 5.

The lookup table LUT may be a result (or a learning result) that is obtained by testing (or learning) various workloads, and may be stored as firmware of the storage device 100 in the process of manufacturing the storage device 100. The lookup table LUT may be stored in the nonvolatile memory device 120, and may be loaded onto the storage controller 110 from the nonvolatile memory device 120 when the storage device 100 is booted up. In another implementation, the lookup table LUT may be replaced with a hardware accelerator or a hardware calculator.

Figure 7:
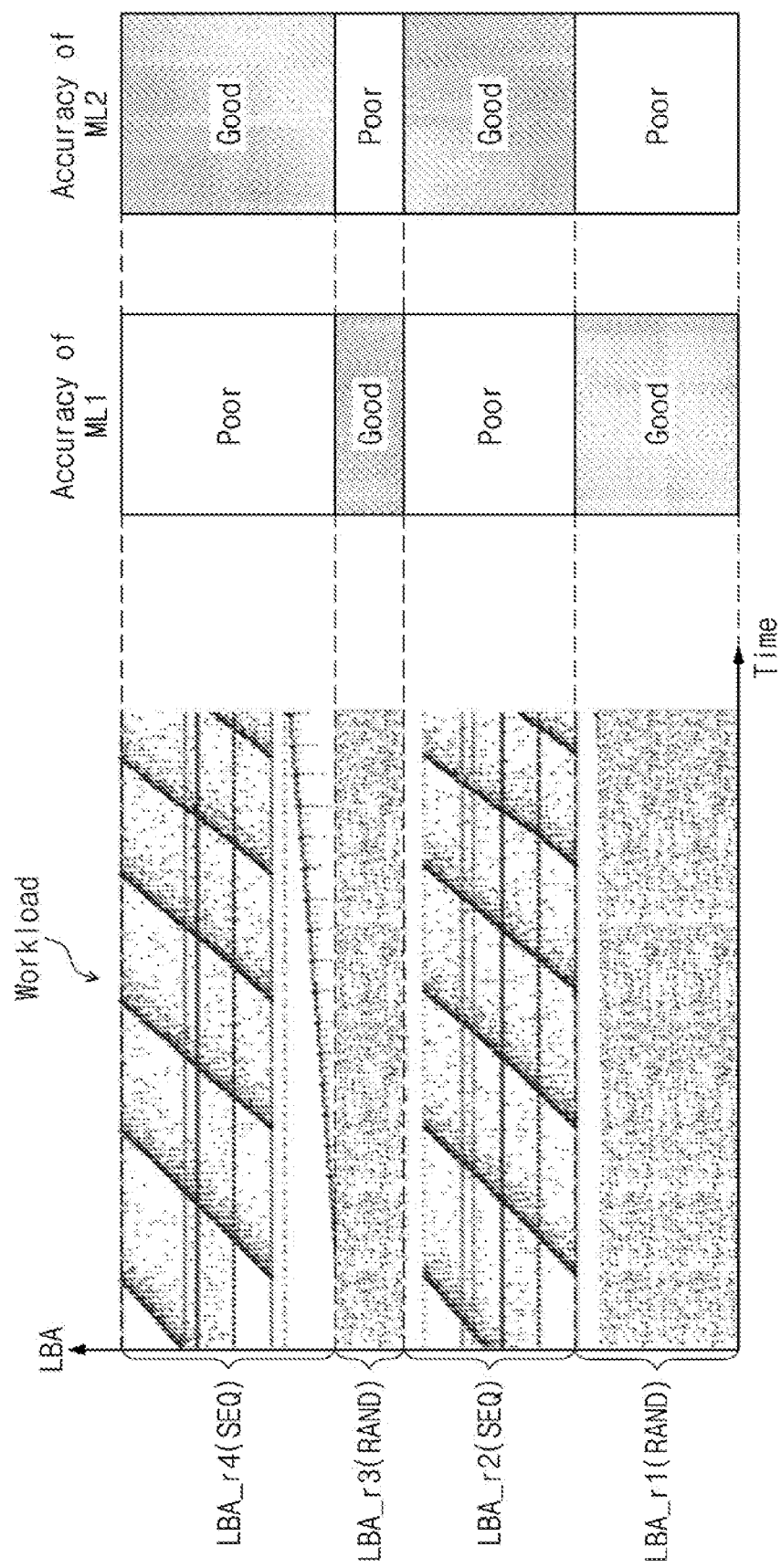
FIGS. 7 to 9 are diagrams for describing an operation of a stream manager of FIG. 5.
Figure 8:
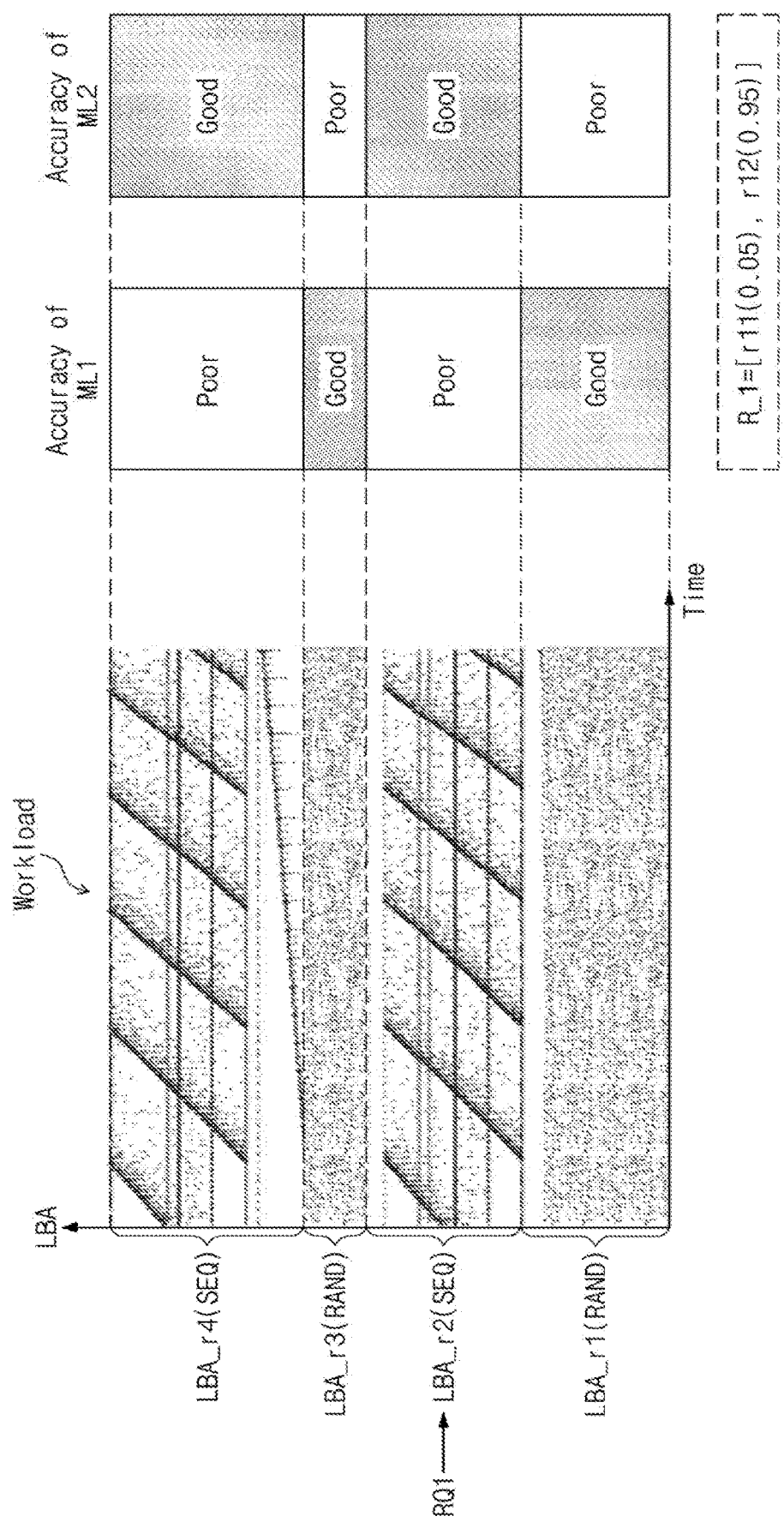
Figure 9:
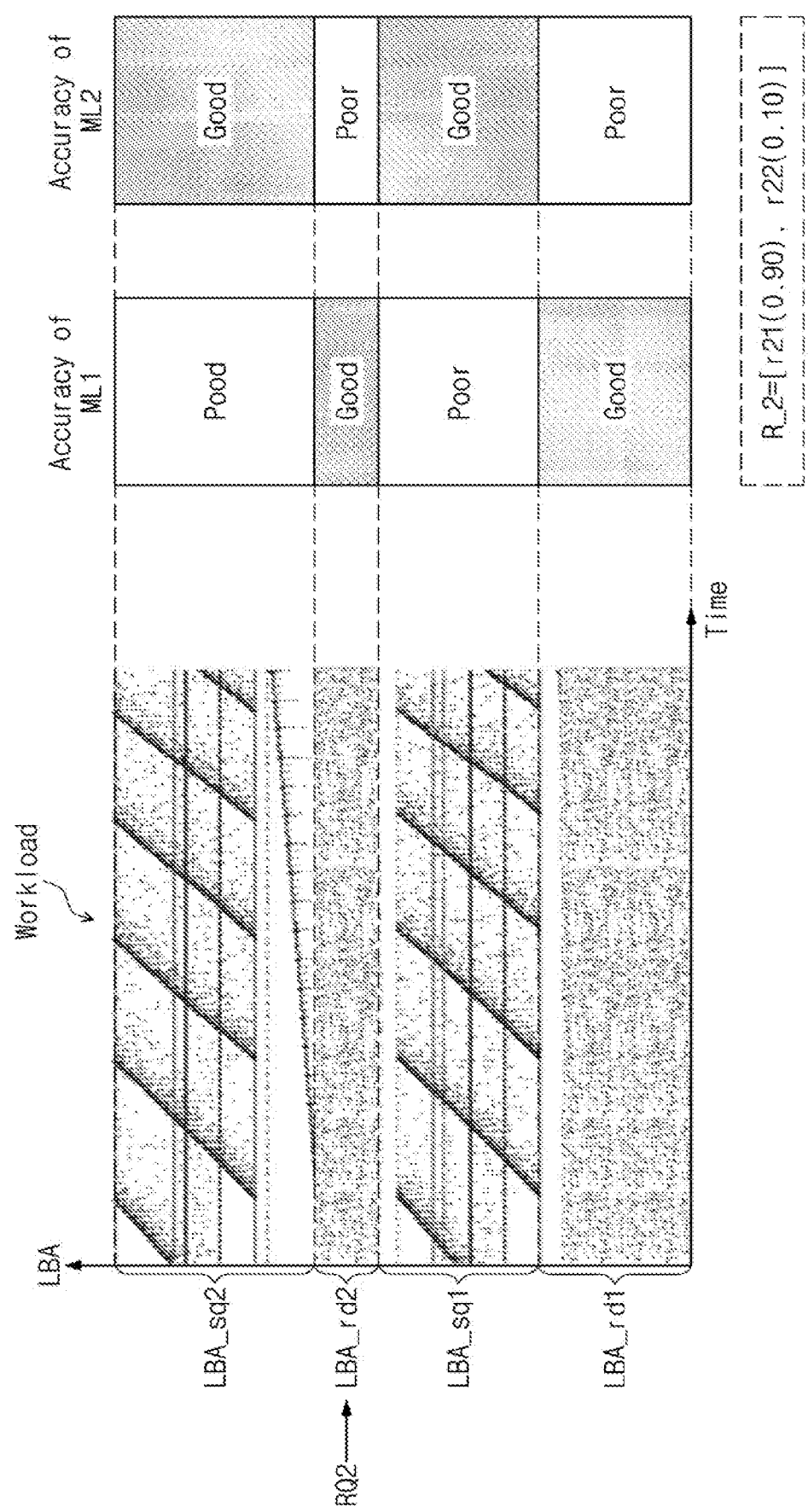

FIGS. 7 to 9 are diagrams for describing an operation of a stream manager of FIG. 5.

For convenience of description, it is assumed that the stream manager 118 performs stream classification by using two machine learning models ML1 and ML2, but the stream manager 118 may further include more machine learning models. For convenience of description, it is assumed that a characteristic of the write request RQ is a logical block address of the write request RQ. Also, it is assumed that the first and second machine learning models ML1 and ML2 are learned based on a workload illustrated in FIGS. 7 to 9. The workload may include a sequential pattern and a random pattern. In the workload, a first logical block address range LBA_rd1 and a third logical block address range LBA_r3 may be a set of I/O requests having the random pattern (RAND.), and a second logical block address range LBA_r2 and a fourth logical block address range LBA_r4 may be a set of I/O requests having the sequential pattern (SEQ.). A characteristic of a workload or a characteristic of a write request may be classified as a sequential pattern or a random pattern based on a logical block address range.

Referring to FIG. 7, the stream classification performance or accuracy of the first machine learning model ML1 may be relatively good in the case of the random pattern (RAND.) but may be relatively poor in the case of the sequential pattern (SEQ.). On the other hand, the stream classification performance or accuracy of the second machine learning model ML2 may be relatively poor in the case of the random pattern (RAND.) but may be relatively good in the case of the sequential pattern (SEQ.). Thus, stream classification performance on the same write request may vary depending on a machine learning model or a machine learning algorithm. The stream manager 118 according to an example embodiment may differently apply a model ratio to each of the plurality of machine learning models ML1 to MLn, based on a range according to a characteristic of the write request RQ, and thus, the stream classification accuracy about all ranges according to a characteristic of the write request RQ may be improved.

For example, referring to FIGS. 1, 5, and 8, a first write request RQ1 received from the host 11 may be included in a second logical block address range LBA_r2. Each of the first and second machine learning models ML1 and ML2 of the stream manager 118 may perform machine learning on the first write request RQ1 to draw a result value. The model ratio calculator MRC of the stream manager 118 may select or calculate a first model ratio R_1 as a model ratio corresponding to the second logical block address range LBA_r2. The second logical block address range LBA_r2 may correspond to the sequential pattern (SEQ.), and the second machine learning model ML2 may have higher stream classification and accuracy about the sequential pattern (SEQ.) than the first machine learning model ML1. Accordingly, at the first model ratio R_1, a coefficient r11 corresponding to the first machine learning model ML1 may be set to 0.05, and a coefficient r12 corresponding to the second machine learning model ML2 may be set to 0.95. In the case where the stream identifier SID is calculated based on the first model ratio R_1, there may be predominantly applied a result value of the second machine learning model ML2 having higher performance and accuracy about the sequential pattern (SEQ.).

On the other hand, referring to FIGS. 1, 5, and 9, a second write request RQ2 received from the host 11 may be included in a third logical block address range LBA_r3. Each of the first and second machine learning models ML1 and ML2 of the stream manager 118 may perform machine learning on the second write request RQ2 to draw a result value. The model ratio calculator MRC of the stream manager 118 may select or calculate a second model ratio R_2 as a model ratio corresponding to the third logical block address range LBA_r3. The third logical block address range LBA_r3 may correspond to the random pattern (RAND.), and the first machine learning model ML1 may have higher stream classification and accuracy about the random pattern (RAND.) than the second machine learning model ML2. Accordingly, at the second model ratio R_2, a coefficient r21 corresponding to the first machine learning model ML1 may be set to 0.90, and a coefficient r22 corresponding to the second machine learning model ML2 may be set to 0.10. In the case where the stream identifier SID is calculated based on the second model ratio R_2, there may be predominantly applied a result value of the first machine learning model ML1 having higher performance and accuracy about the random pattern (RAND.).

As described above, the storage device 100 according to an example embodiment may perform stream classification on a write request or an input/output request by using a plurality of machine learning models. In this case, the storage device 100 may select or calculate a model ratio to be applied to the plurality of machine learning models, based on a characteristic of the write request or the input/output request. Accordingly, stream classification performance and accuracy about all ranges according to a characteristic of a write request or an input/output request may be improved. This may improve the overall performance of the storage device 100.

Figure 10:
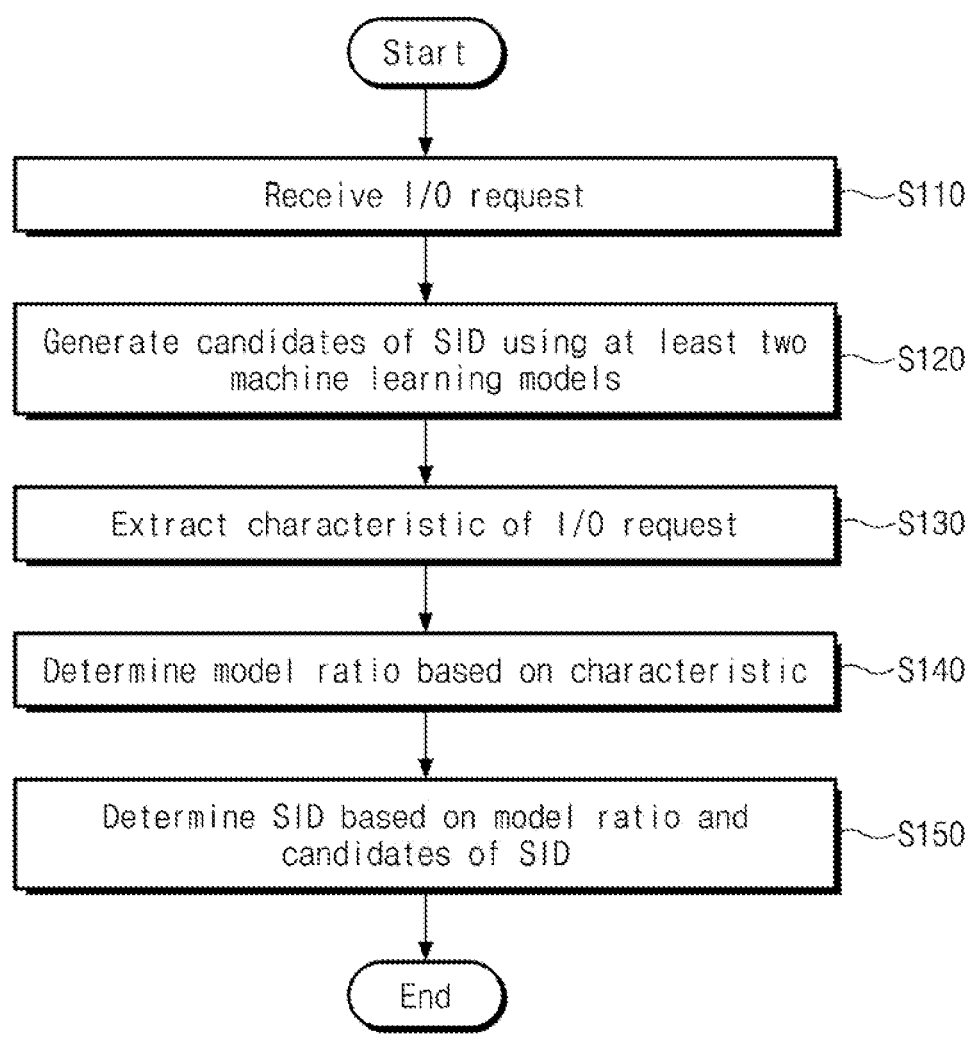
FIG. 10 is a flowchart illustrating an operation of a storage device of FIG. 1.

FIG. 10 is a flowchart illustrating an operation of a storage device of FIG. 1.

Referring to FIGS. 1 and 10, in operation S110, the storage device 100 may receive an input/output (I/O) request from the host 11. For example, the storage device 100 may receive the I/O request from the host 11 through the host interface circuit 116. The I/O request may be the write request described above. The I/O request may not include information about a stream identifier. In another implementation, the I/O request may include a logical stream identifier. The logical stream identifier may be information called a stream managed by the host 11, independently of a stream identifier (i.e., a physical stream identifier) managed by the storage device 100. The number of logical streams managed by the host 11 may be more than the number of physical streams managed by the storage device 100. In this case, because the storage device 100 uses separate management or stream allocation for mapping logical streams onto physical streams, the storage device 100 may perform mapping between logical streams and physical streams based on the operation method described above.

The I/O request may include a plurality of write requests accumulated. For example, the storage device 100 may receive a plurality of write requests from the host 11, and may accumulate the received write requests. The storage device 100 may perform stream allocation in units of I/O request, which is a unit composed of the plurality of write requests accumulated. The number of accumulated write requests included in one I/O request (i.e., a unit by which stream allocation is performed) may be determined in advance. In another implementation, a size of accumulated write data corresponding to accumulated write requests included in one I/O request (i.e., a unit by which stream allocation is performed) may be determined in advance.

After operation S110, the storage device 100 may perform operation S120 to operation S150. In another implementation, the storage device 100 may perform operation S120 to operation S150 on each of I/O requests. In another implementation, the storage device 100 may accumulate I/O requests in operation S110 as much as a given size unit, and may perform operation S120 to operation S150 based on the given size unit. The storage device 100 may classify and accumulate I/O requests depending on logical block address ranges. Below, for convenience of description, it is assumed that operation S120 to operation S150 are performed on one I/O request.

In operation S120, the storage device 100 may generate candidates of a stream identifier by using at least two machine learning models (or a plurality of machine learning models). For example, the storage device 100 may draw result values by performing machine learning on the I/O request based on the plurality of machine learning models. The result values may be candidates of a stream identifier. The plurality of machine learning models may be based on different machine learning algorithms, and the plurality of machine learning models may have different stream classification performance and accuracy in sections determined according to characteristics of I/O requests.

In operation S130, the storage device 100 may extract a characteristic of the I/O request. The characteristic of the I/O request may include information such as a logical block address, a logical block address range, and a request size. In another implementation, the characteristic of the I/O request may include an overwrite ratio and a logical block address continuity of adjacent I/O requests (or workloads), which may be obtained by sampling I/O requests or write requests.

In operation S140, the storage device 100 may determine a model ratio based on the extracted characteristic. For example, the stream manager 118 of the storage device 100 may determine a model ratio to be applied to each of the plurality of machine learning models, based on the configuration described with reference to FIG. 6.

In operation S150, the storage device 100 may determine the stream identifier SID of the I/O request, based on the candidates of the stream identifier and the model ratio. For example, the stream manager 118 of the storage device 100 may determine the stream identifier SID of the I/O request by applying the model ratio to each of the candidates of the stream identifier SID (i.e., each of the result values of the plurality of machine learning models). In this case, because a machine learning model having higher stream classification performance on the characteristic of the I/O request from among the plurality of machine learning models is predominantly applied to the stream identifier SID finally determined, performance and accuracy about stream identifier allocation and classification may be improved.

Figure 11:
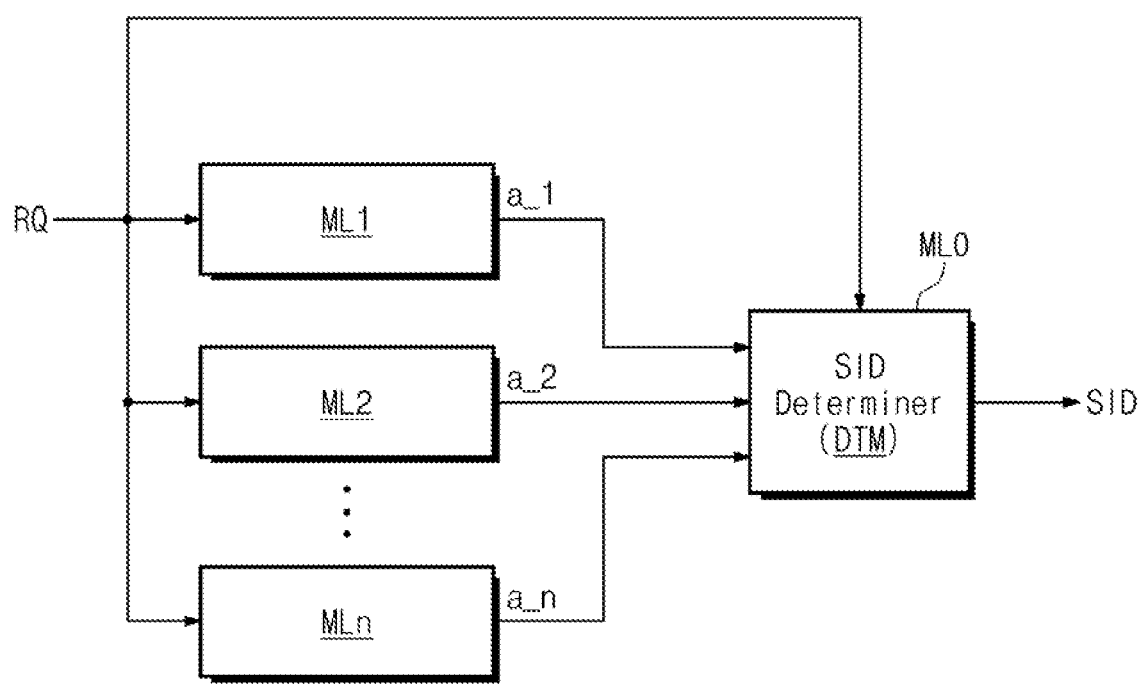
FIG. 11 is a diagram illustrating a stream manager of FIG. 1.

FIG. 11 is a diagram illustrating a stream manager of FIG. 1. For convenience of description, additional description associated with the components described above will be omitted to avoid redundancy.

Referring to FIGS. 1 and 11, a stream manager 118-A may include a plurality of machine learning models ML1 to MLn and a stream identifier determiner DTM. The plurality of machine learning models ML1 to MLn may perform machine learning on the write request RQ, and may output the result values a_1 to a_n, respectively. The plurality of machine learning models ML1 to MLn are described above, and thus, additional description will be omitted to avoid redundancy.

The stream identifier determiner DTM may be implemented with a 0-th machine learning model ML0. The 0-th machine learning model ML0 may be an ensemble model that is configured to combine the result values a_1 to a_n of the plurality of machine learning models ML1 to MLn, based on the write request RQ. Thus, unlike the embodiment of FIG. 6, the stream manager 118-A may combine the result values a_1 to a_n of the plurality of machine learning models ML1 to MLn by using the 0-th machine learning model ML0 (or the ensemble model), and thus, may determine a final stream identifier SID without a separate lookup table LUT including a relationship between the model ratio R_x and a characteristic CRx.

Without information about a separate characteristic of the write request RQ, the 0-th machine learning model ML0 may infer or draw the final stream identifier SID by using the result values a_1 to a_n of the plurality of machine learning models ML1 to MLn as input values. The 0-th machine learning model ML0 may be learned during the above inference process.

As described above, the storage device 100 may identify or classify an I/O request from the host 11 in units of stream, and may manage the I/O request thus identified or classified. For example, the storage device 100 may generate candidates of a stream identifier for an I/O request by using a plurality of machine learning models, and may determine a model ratio based on a characteristic of the I/O request. The storage device 100 may determine the final stream identifier SID by applying the model ratio to the candidates of the stream identifier. Compared to the case of classifying a stream by using a single machine learning model, because a stream is classified by using a plurality of machine learning models and a model ratio differently determined according to a characteristic of an I/O request is applied to the plurality of machine learning models, stream classification performance and accuracy may be improved in all sections determined according to characteristics of I/O requests.

Figure 12:
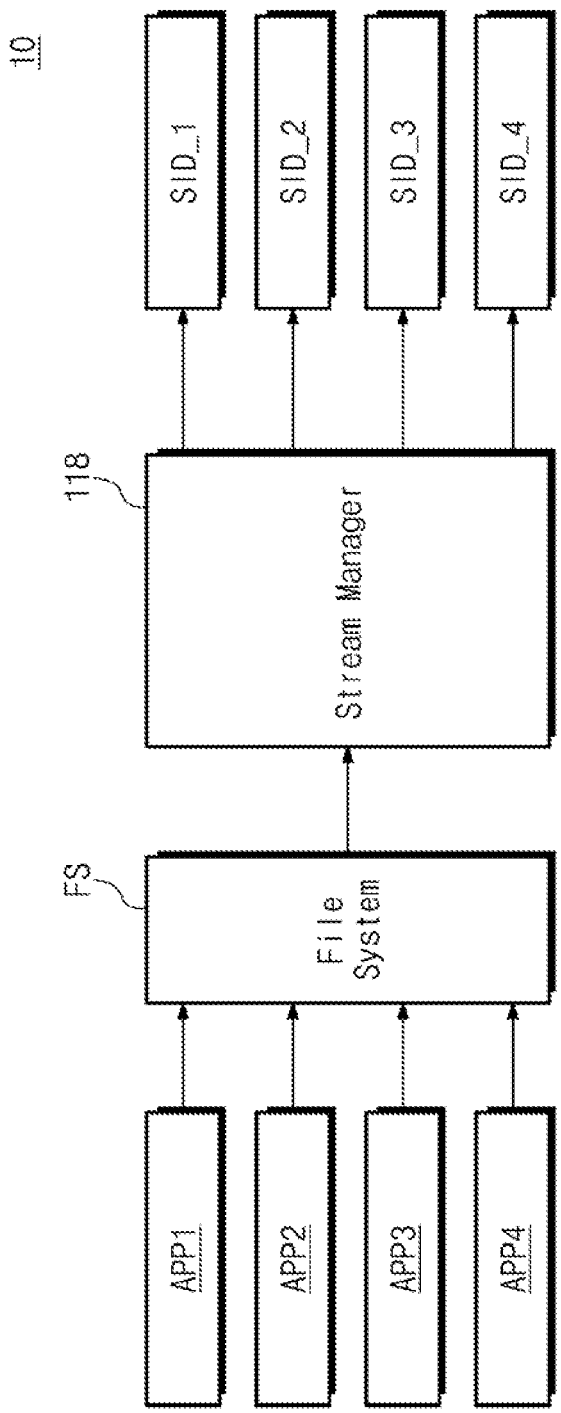
FIG. 12 is a block diagram illustrating a storage system which includes a storage device according to an example embodiment.

FIG. 12 is a block diagram illustrating a storage system which includes a storage device according to an example embodiment. A configuration of a storage device of FIG. 12 may be similar to the configuration of the storage device 100 of FIG. 1.

Referring to FIGS. 1 and 12, a plurality of applications APP1 to APP4 may be driven at the storage system 10. The plurality of applications APP1 to APP4 may be driven on the host 11. The host 11 may be implemented in a multi-tenant structure, and the plurality of applications APP1 to APP4 may be respectively driven on different tenants. Each of the plurality of applications APP1 to APP4 may be configured to access the storage device 100 through a file system FS. Files or data that are respectively generated by the plurality of applications APP1 to APP4 may have different characteristics.

In a case where the plurality of applications APP1 to APP4 access the storage device 100 through the same file system FS, unless separate information (e.g., stream information managed by the host 11) is provided, the storage device 100 may manage the files or data respectively generated by the plurality of applications APP1 to APP4 in a general manner and, if the files or data respectively generated by the plurality of applications APP1 to APP4 are not classified within the nonvolatile memory device 120, a maintenance operation may be frequently performed.

In the present example embodiment, the stream manager 118 of the storage device 100 may classify the files or data respectively generated by the plurality of applications APP1 to APP4 into a plurality of streams SID_1 to SID_4 based on the stream allocating method described with reference to FIGS. 1 to 12. Thus, the file or data generated by the first application APP1 may be classified as the first stream SID_1, the file or data generated by the second application APP2 may be classified as the second stream SID_2, the file or data generated by the third application APP3 may be classified as the third stream SID_3, and the file or data generated by the fourth application APP4 may be classified as the fourth stream SID_4. In this case, because files or data generated by one application are managed by using the same stream, the number of maintenance operations of the nonvolatile memory device 120 may decrease, or a WAF characteristic may be improved.

Figure 13:
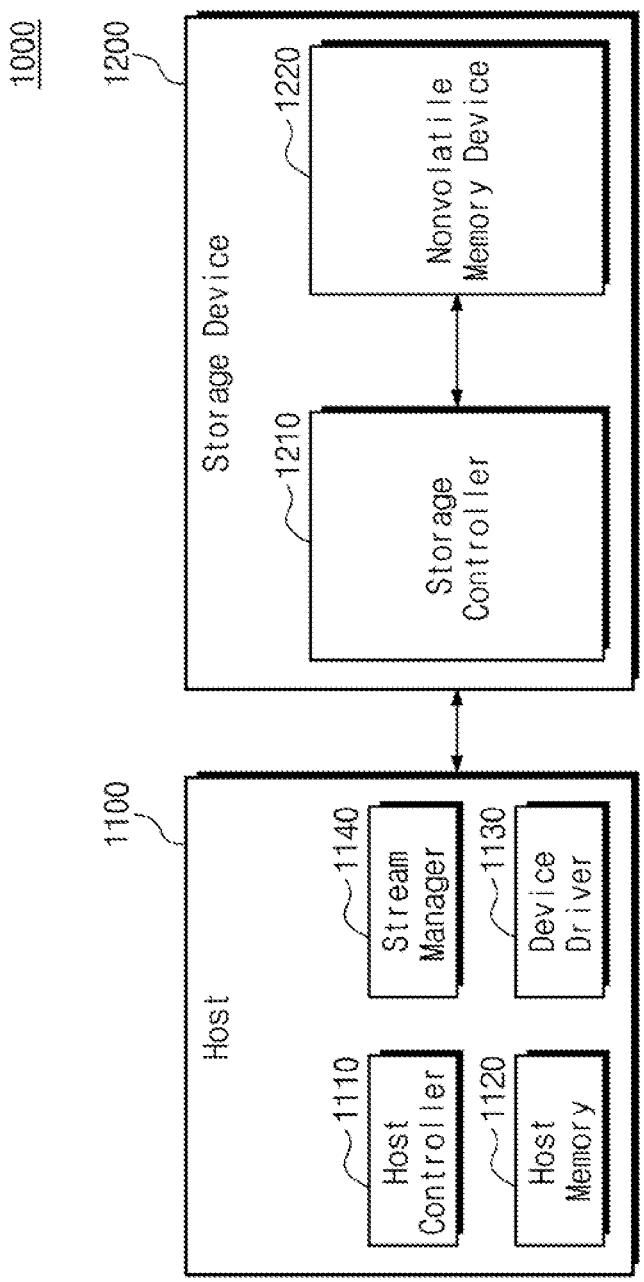
FIG. 13 is a block diagram illustrating a storage system according to an example embodiment.

FIG. 13 is a block diagram illustrating a storage system according to an example embodiment. For convenience of description, additional description associated with the components described above will be omitted to avoid redundancy.

Referring to FIG. 13, a storage system 1000 may include a host 1100 and a storage device 1200. The host 1100 may include a host controller 1110, a host memory 1120, a device driver 1130, and a stream manager 1140. The storage device 1200 may include a storage controller 1210 and a nonvolatile memory device 1220.

In the embodiment described with reference to FIGS. 1 to 12, a storage device may manage a stream associated with a write request. However, in the embodiment of FIG. 13, the host 1100 may be configured to manage a stream associated with data to be stored in the storage device 1200. The stream manager 1140 of the host 1100 may be a stream manager described with reference to FIGS. 1 to 12 or may operate based on the stream allocating method described with reference to FIG. 12.

In the present example embodiment, information about the stream allocated by the stream manager 1140 of the host 1100 may be provided to the storage device 1200 together with a write request.

The storage device 1200 may be configured to manage data based on the stream information provided from the host

1100. The storage device 1200 may be configured to internally manage internal streams associated with write requests, independently of the stream information provided from the host 1100. In this case, the storage device 1200 may manage the internal streams based on the stream allocating method described with reference to FIGS. 1 to 12.

Figure 14:
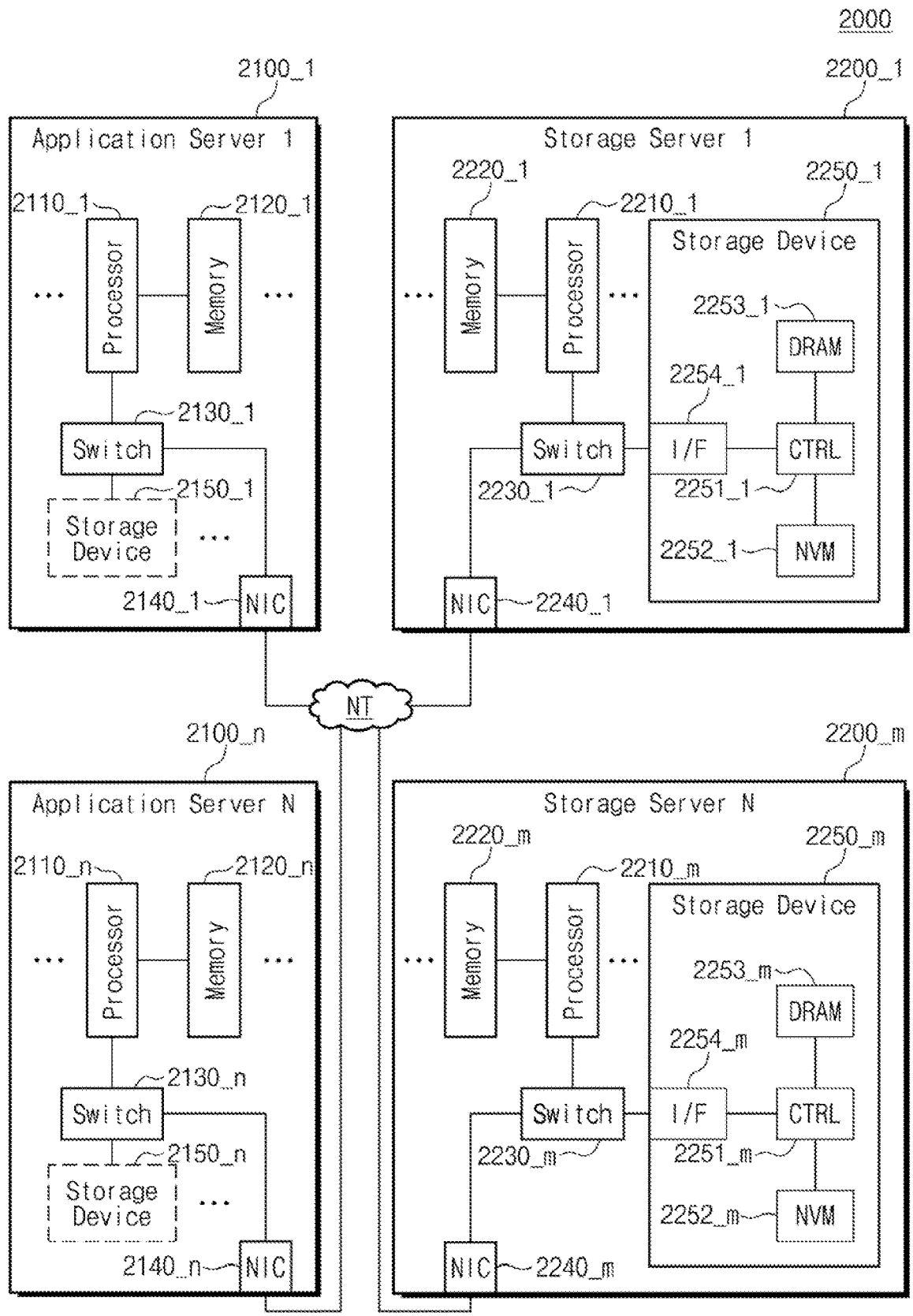
FIG. 14 is a block diagram illustrating a data center which includes a storage device according to an example embodiment.

FIG. 14 is a diagram of a data center 2000 which includes a memory device according to an example embodiment.

Referring to FIG. 14, the data center 2000 may be a facility that collects various types of pieces of data and provides services, and may be referred to as a data storage center. The data center 2000 may be a system for operating a search engine and a database, and may be a computing system used by companies, such as banks, or government agencies.

The data center 2000 may include application servers 2100_1 to 2100_n and storage servers 2200_1 to 2200_m. The number of application servers 2100_1 to 2100_n and the number of storage servers 2200_1 to 2200m may be variously selected, and the number of application servers 2100_1 to 2100_n may be different from the number of storage servers 2200 to 2200_m.

Below, for convenience of description, an embodiment of the first storage server 2200_1 will be described, and each of the other storage servers 2200_2 to 2200_m and the plurality of application servers 2100_1 to 2100_n may have a similar configuration or structure of the first storage server 2200_1.

The storage server 2200_1 may include at least one of a processor 2210_1, a memory 2220_1, a switch 2230_1, a network interface card (NIC) 2240_1, and a storage device 2250_1.

The processor 2210_1 may control all operations of the storage server 2200_1, access the memory 2220_1, and execute instructions and/or data loaded in the memory 2220_1.

The memory 2220_1 may be a double-data-rate synchronous DRAM (DDR SDRAM), a high-bandwidth memory (HBM), a hybrid memory cube (HMC), a dual in-line memory module (DIMM), Optane MINIM, and/or a non-volatile MINIM (NVMDIMM).

The numbers of processors 2210_1 and memories 2220_1 included in the storage server 2200_1 may be variously selected. The processor 2210_1 and the memory 2220_1 may provide a processor-memory pair. The number of processors 2210_1 may be different from the number of memories 2220_1. The processor 2210_1 may include a single-core processor or a multi-core processor.

The switch 2230_1 may selectively connect the processor 2210_1 to the storage device 2250_1 or selectively connect the NIC 2240_1 to the storage device 2250_1 via the control of the processor 2210_1.

The NIC 2240_1 may be configured to connect the first storage server 2200_1 with a network NT. The NIC 2240_1 may include a network interface card and a network adaptor. The NIC 2240_1 may be connected to the network NT by a wired interface, a wireless interface, a Bluetooth interface, or an optical interface. The NIC 2240_1 may include an internal memory, a digital signal processor (DSP), and a host bus interface, and may be connected to the processor 2210_1 and/or the switch 2230_1 through the host bus interface. The host bus interface may be implemented as one of the above-described examples of the interface 2254_1 such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface. The NIC 2240_1 may be integrated with at least one of the processor 2210_1, the switch 2230_1, and the storage device 2250_1.

The storage device 2250_1 may be store or read out data under the control of the processor 2210_1. The storage device 2250_1 may include a controller 2251_1, a nonvolatile memory 2252_1, DRAM 2253_1, and an interface 2254_1. The storage device 2250 may include a secure element (SE) for security or privacy.

The controller 2251_1 may control all operations of the storage device 2250_1. The controller 2251_1 may include SRAM. The controller 2251_1 may write data to the nonvolatile memory 2252_1 in response to a write command or read data from the nonvolatile memory 2252_1 in response to a read command. The controller 2251_1 may be configured to control the nonvolatile memory 2252_1 based on a Toggle interface or an ONFI interface.

The DRAM 2253_1 may temporarily store (or buffer) data to be written to the nonvolatile memory 2252_1 or data read from the nonvolatile memory 2252_1. The DRAM 2253 may store data used for the storage controller 110 to operate, such as metadata or mapping data.

The interface 2254_1 may provide a physical connection between the at least one of processor 2210_1, the memory 2220_1, the network interface card (NIC) 2240_1, and the controller 2251_1. The interface 2254_1 may be implemented using a direct attached storage (DAS) scheme in which the storage device 2250_1 is directly connected with a dedicated cable. The interface 2254_1 may be implemented by using various interface schemes, such as ATA, SATA, e-SATA, an SCSI, SAS, PCI, PCIe, NVMe, IEEE 1394, a USB interface, an SD card interface, an MMC interface, an eMMC interface, a UFS interface, an eUFS interface, and/or a CF card interface.

The above configuration of the storage server 2200_1 may be applied to each of other storage servers or the plurality of application servers. In each of the plurality of application servers 2100_1 to 2100_n, the storage device may be selectively omitted.

The application servers 2100_1 to 2100_n may communicate with the storage servers 2200_1 to 2200_m through the network NT. The network NT may be implemented by using, e.g., a fiber channel (FC) or Ethernet. The FC may be a medium used for relatively high-speed data transmission and use an optical switch with high performance and high availability. The storage servers 2200_1 to 2200_m may be provided as file storages, block storages, or object storages according to an access method of the network NT.

The network NT may be a storage-dedicated network, such as a storage area network (SAN). For example, the SAN may be an FC-SAN, which uses an FC network and is implemented according to an FC protocol (FCP). As another example, the SAN may be an Internet protocol (IP)-SAN, which uses a transmission control protocol (TCP)/IP network and is implemented according to a SCSI over TCP/IP or Internet SCSI (iSCSI) protocol. As another example, the network 2300 may be a general network, such as a TCP/IP network. For example, the network 2300 may be implemented according to a protocol, such as FC over Ethernet (FCoE), network attached storage (NAS), and NVMe over Fabrics (NVMe-oF).

At least one of the plurality of application servers 2100_1 to 2100_n may be configured to access at least another one of the plurality of application servers 2100_1 to 2100_n or at least one of the plurality of storage servers 2200_1 to 2200_m.

For example, the application server 2100_1 may store data, which is requested by a user or a client to be stored, in one of the storage servers 2200_1 to 2200_m through the network NT. Also, the application server 2100_1 may obtain data, which is requested by the user or the client to be read, from one of the storage servers 2200_1 to 2200_m through the network NT. For example, the application server 2100_1 may be implemented as a web server or a database management system (DBMS).

The application server 2100_1 may access a memory 2120_n or a storage device 2150_n, which is included in another application server 2100_n, through the network NT. In another implementation, the application server 2100_1 may access memories 2220_1 to 2220_m or storage devices 2250_1 to 2250_m, which are included in the storage servers 2200_1 to 2200_m, through the network 2300_1. Thus, the application server 2100_1 may perform various operations on data stored in application servers 2100_1 to 2100_n and/or the storage servers 2200_1 to 2200_m. For example, the application server 2100_1 may execute an instruction for moving or copying data between the application servers 2100_1 to 2100_n and/or the storage servers 2200_1 to 2200_m. In this case, the data may be moved from the storage devices 2250_1 to 2250_m of the storage servers 2200_1 to 2200_m to the memories 2120_1 to 2120_n of the application servers 2100_1 to 2100_n directly or through the memories 2220_1 to 2220m of the storage servers 2200_1 to 2200_m. The data moved through the network NT may be data encrypted for security or privacy.

At least one of the storage servers 2200_1 to 2200_m or the storage devices 2150_1 to 2150_n and 2250_1 to 2250_m may include a stream manager according to an example embodiment. At least one of the storage servers 2200_1 to 2200_m or the storage devices 2150_1 to 2150_n and 2250_1 to 2250_m may be configured to allocate and manage a stream to input data based on the method described with reference to FIGS. 1 to 12.

By way of summation and review, a host using an SSD may generate various kinds of data depending on applications. To make the operating performance of the storage device better, the host may provide information about data to the storage device together with the data. However, in the case where the host does not control information, an issue may occur in improving the performance and lifetime of the SSD.

As described above, embodiments may provide an operation method of a storage device configured to support a multi-stream, which is capable of improving performance and lifetime by dividing data from a host in units of stream.

According to an example embodiment, a storage device may allocate a stream to a write request received from a host, based on a plurality of machine learning models. In this case, the storage device may determine a model ratio of each of the plurality of machine learning models based on a characteristic of the received write request. Accordingly, because write requests having similar characteristics are managed by using the same stream, there is provided an operation method of a storage device configured to support a multi-stream, which is capable of improving performance.

Components described in the specification by using the terms "part", "unit", "module", "engine", etc. and function blocks illustrated in drawings may be implemented with software, hardware, or a combination thereof. For example, the software may be a machine code, firmware, an embedded code, and application software. For example, the hardware may include an electrical circuit, an electronic circuit, a processor, a computer, an integrated circuit, integrated circuit cores, a pressure sensor, an inertial sensor, a microelectromechanical system (MEMS), a passive element, or a combination thereof.

Example embodiments have been disclosed herein, and although specific terms are employed, they are used and are to be interpreted in a generic and descriptive sense only and not for purpose of limitation. In some instances, as would be apparent to one of ordinary skill in the art as of the filing of the present application, features, characteristics, and/or elements described in connection with a particular embodiment may be used singly or in combination with features, characteristics, and/or elements described in connection with other embodiments unless otherwise specifically indicated. Accordingly, it will be understood by those of skill in the art that various changes in form and details may be made without departing from the spirit and scope of the present invention as set forth in the following claims.

What is claimed is:

1. An operation method of a storage device which supports a multi-stream, the method comprising:
    receiving, by a storage controller circuit, an input/output request from an external host;
    generating, by the storage controller circuit, a plurality of stream identifier candidates by performing machine learning on the input/output request based on a plurality of machine learning models that are based on different machine learning algorithms;
    generating, by the storage controller circuit, a model ratio based on a characteristic of the input/output request;
    applying, by the storage controller circuit, the model ratio to the plurality of stream identifier candidates to allocate a final stream identifier for the input/output request; and
    storing, by the storage controller circuit, write data corresponding to the input/output request in a nonvolatile memory device of the storage device based on the final stream identifier.

2. The method as claimed in claim 1,
    wherein the characteristic of the input/output request includes at least one of a logical block address, a logical block address range, and a request size of the input/output request.

3. The method as claimed in claim 1,
    wherein the characteristic of the input/output request includes at least one of an overwrite ratio and a logical block address continuity of input/output requests adjacent to the input/output request.

4. The method as claimed in claim 1,
    wherein the model ratio includes a plurality of coefficients respectively corresponding to the plurality of machine learning models, and
    wherein the plurality of coefficients have different values.

5. The method as claimed in claim 4,
    wherein the plurality of coefficients when the characteristic of the input/output request corresponds to a first logical block address range are different from the plurality of coefficients when the characteristic of the input/output request corresponds to a second logical block address range.

6. The method as claimed in claim 1,
    wherein each of the plurality of machine learning models is based on at least one of a linear regression algorithm, a support vector machine algorithm, a deep neural network algorithm, a deep stream algorithm, a K-Mean algorithm, a clustering algorithm, an auto encoder algorithm, a convolutional neural network algorithm, and a Siamese network algorithm.

7. The method as claimed in claim 1,
wherein the generating of the model ratio based on the characteristic of the input/output request includes:
extracting the characteristic of the input/output request; and
selecting and outputting the model ratio corresponding to the characteristic from a lookup table, and
wherein the lookup table includes a plurality of entries, and each of the plurality of entries includes information about a model ratio corresponding to each of a plurality of characteristics.

8. The method as claimed in claim 7, wherein the lookup table is included in firmware of the storage device.

9. The method as claimed in claim 1,
wherein, when the final stream identifier is a first stream identifier, the write data are stored in a first memory block of the nonvolatile memory device, and
wherein, when the final stream identifier is a second stream identifier different from the first stream identifier, the write data are stored in a second memory block of the nonvolatile memory device, which is different from the first memory block.

10. The method as claimed in claim 1,
wherein the input/output request includes accumulated write requests, and a size of accumulated write data corresponding to the accumulated write requests is a given size.

11. The method as claimed in claim 1, wherein the input/output request includes accumulated write requests, and a number of the accumulated write requests is a given number.

* * * * *